(12) United States Patent
Jenkins et al.

(10) Patent No.: US 9,753,673 B1
(45) Date of Patent: Sep. 5, 2017

(54) BUS-POWERED DATA STORAGE DEVICE WITH WARNING ALARM TRIGGERED BY IMPROPER REMOVAL OF POWER FROM HOST COMPUTE DEVICE

(71) Applicant: Western Digital Technologies, Inc., Irvine, CA (US)

(72) Inventors: Dean Mitcham Jenkins, La Canada-Flintridge, CA (US); Annette Marie Stanley-Arslanok, Fountain Valley, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 45 days.

(21) Appl. No.: 14/982,860

(22) Filed: Dec. 29, 2015

(51) Int. Cl.
| | |
|---|---|
| *G06F 12/00* | (2006.01) |
| *G06F 3/06* | (2006.01) |
| *G06F 12/0891* | (2016.01) |
| *G06F 13/40* | (2006.01) |
| *G06F 12/0804* | (2016.01) |

(52) U.S. Cl.
CPC .......... *G06F 3/0653* (2013.01); *G06F 3/0604* (2013.01); *G06F 3/068* (2013.01); *G06F 3/0614* (2013.01); *G06F 3/0679* (2013.01); *G06F 12/0891* (2013.01); *G06F 13/4068* (2013.01); *G06F 12/0804* (2013.01); *G06F 2212/60* (2013.01)

(58) Field of Classification Search
None
See application file for complete search history.

(56) References Cited

U.S. PATENT DOCUMENTS

| | | |
|---|---|---|
| 6,934,774 B1 | 8/2005 | Sundaram et al. |
| 7,701,705 B1 | 4/2010 | Szeremeta |
| 8,064,194 B2 | 11/2011 | Szeremeta |
| 8,113,873 B1 | 2/2012 | Sarraf |
| 8,133,426 B1 | 3/2012 | Yurchenco et al. |
| 8,358,395 B1 | 1/2013 | Szeremeta |
| 8,417,979 B2 | 4/2013 | Maroney |
| 8,462,460 B1 | 6/2013 | Szeremeta et al. |
| 8,473,664 B2 | 6/2013 | Stemmer |
| 8,498,088 B1 | 7/2013 | Klein |
| 8,547,658 B1 | 10/2013 | Szeremeta |
| 2009/0184932 A1 | 7/2009 | Alten |

(Continued)

OTHER PUBLICATIONS

Martin E. Schulze, U.S. Appl. No. 14/563,633, filed Dec. 8, 2014, 27 pages.

*Primary Examiner* — Brian Peugh
(74) *Attorney, Agent, or Firm* — Chang & Hale LLP (57) ABSTRACT

A data storage device is disclosed configured to connect to a host compute device via a power bus and at least one data bus, the data storage device comprising an I/O port configured to receive power from the power bus and provide data to and receive data from the host compute device via the at least one data bus, a timer configured to open a timing window when a cache flush command is received from the host compute device and close the timing window after a predetermined amount of time has expired or a host write command is received, and control circuitry configured to detect when the power from the host compute device is removed, determine whether the timing window is closed, and, if the timing window is closed, provide a warning alarm to indicate improper removal of the power from the host compute device.

30 Claims, 4 Drawing Sheets

(56) References Cited

U.S. PATENT DOCUMENTS

| | | | |
|---|---|---|---|
| 2010/0205367 A1* | 8/2010 | Ehrlich | G06F 12/0804 |
| | | | 711/113 |
| 2010/0332747 A1* | 12/2010 | Tomioka | G06F 12/0804 |
| | | | 711/113 |
| 2013/0290380 A1* | 10/2013 | Flickner | H04N 21/4332 |
| | | | 707/803 |
| 2013/0346652 A1 | 12/2013 | Stemmer | |
| 2014/0101345 A1 | 4/2014 | Ranta | |

* cited by examiner

BUS-POWERED DATA STORAGE DEVICE WITH WARNING ALARM TRIGGERED BY IMPROPER REMOVAL OF POWER FROM HOST COMPUTE DEVICE

BACKGROUND

Data storage devices (such as hard disk drives (HDDs), solid state hybrid drives (SSHDs), or solid-state storage devices (solid-state drives (SSDs), flash sticks or SD cards) that are bus-powered may be connected to a host compute device (such as a PC or laptop computer) via a power bus and at least one data bus. For some data storage devices (such as bus-power HDDs and SSDs), the power bus and the at least one data bus reside in a cable (such as a USB, USB-C, or Thunderbolt cable), which provides a connection to the host compute device. Other bus-powered data storage devices (such as flash sticks and SD cards) plug directly into the host compute device and, therefore, do not need a cable to connect to the power bus and the at least one data bus of the host. In the bus-power data storage devices, power is received from the host compute device via the power bus and data is exchanged between the devices via the at least one data bus.

When a user wants to disconnect a bus-powered data storage device from a host compute device, there is a proper removal procedure to follow that depends on the operating system in use on the host compute device. For example, if a Windows® 7 operating system is being used, the user right clicks on the on-screen icon representing the bus-powered data storage device on the screen of the host compute device and selects "Eject" from a pull down menu. After selecting "Eject" from the pull menu, the message "Safe to Remove Hardware" appears at the bottom of the screen, and the user can safely disconnect the bus-powered data storage device from the host compute device. If the proper removal procedure is not followed, a loss of data may occur in the bus-powered data storage device by improperly disconnecting it from the host compute device.

BRIEF DESCRIPTION OF THE DRAWINGS

Data storage devices and methods that embody the various features of the invention will now be described with reference to the following drawings, in which.

DETAILED DESCRIPTION

Various embodiments of the invention are directed to providing a warning alarm in a data storage device (e.g., an HDD, SSHD, or solid state storage device (e.g., SSD, flash stick, or SD card) that is bus-powered (e.g., receives its power from a host compute device (such as a PC or laptop computer) via a power bus) when the power is improperly removed from the data storage device. In one embodiment, an actuator arm in an HDD or SSHD is caused to move such that its movement makes a unique sound that provides the warning alarm. For example, the actuator arm may be controlled to move such that its movement makes the unique sound by activating an alarm software routine stored in memory in an alarm control module in the data storage device.

In various embodiments of the invention, control circuitry in the data storage device determines that the power received from the host compute device is improperly removed from the data storage device by determining that a timing window is closed when detecting that the power is removed. For example, the control circuitry may detect when the power is removed by monitoring a power bus coupled to an I/O port in the data storage device. For example, the I/O port may be a USB or Thunderbolt™ port. In various embodiments, a timer is configured to open the timing window when a cache flush command is received from the host compute device, and closes the timing window after a predetermined amount of time has expired or a host write command is received. For example, the timer may be implemented in hardware or firmware.

In various embodiments, after the control circuitry detects that power from the host compute device is removed from the data storage device and determines that a timing window is closed, the control circuitry activates the alarm software routine to cause the warning alarm to be provided to indicate improper removal of the power from the data storage device. In some embodiments, the control circuitry causes a warning alarm device to provide the warning alarm by activating the alarm software routine. For example, the warning alarm device may provide an audible or visual warning alarm depending on whether the warning alarm device comprises a light-emitting device (e.g., an LED), or a sound-emitting device (e.g., an annunciator). In one embodiment, the warning alarm device comprises both a sound-emitting device and a light-emitting device for providing a visual and an audible warning alarm when the alarm software routine is activated.

In one embodiment, the warning alarm device comprises an LED that may also be used to perform another function in the data storage device. For example, the LED may provide a warning alarm and also be a power or data activity indicator for the data storage device. In one embodiment, the alarm software routine may be input into the data storage device by a user via an I/O port in the data storage device, thereby allowing the user to determine the particle sound, pattern of sounds or visual effect that is to be used for the warning alarm.

Various embodiments of the invention will now be described. These embodiments are presented by way of example only, and are not intended to limit the scope of the invention. Various omissions, substitutions and changes in the form of the methods and devices described herein may be made without departing from the spirit of the invention. To illustrate some of the embodiments, reference will now be made to the figures.

Figure 1:
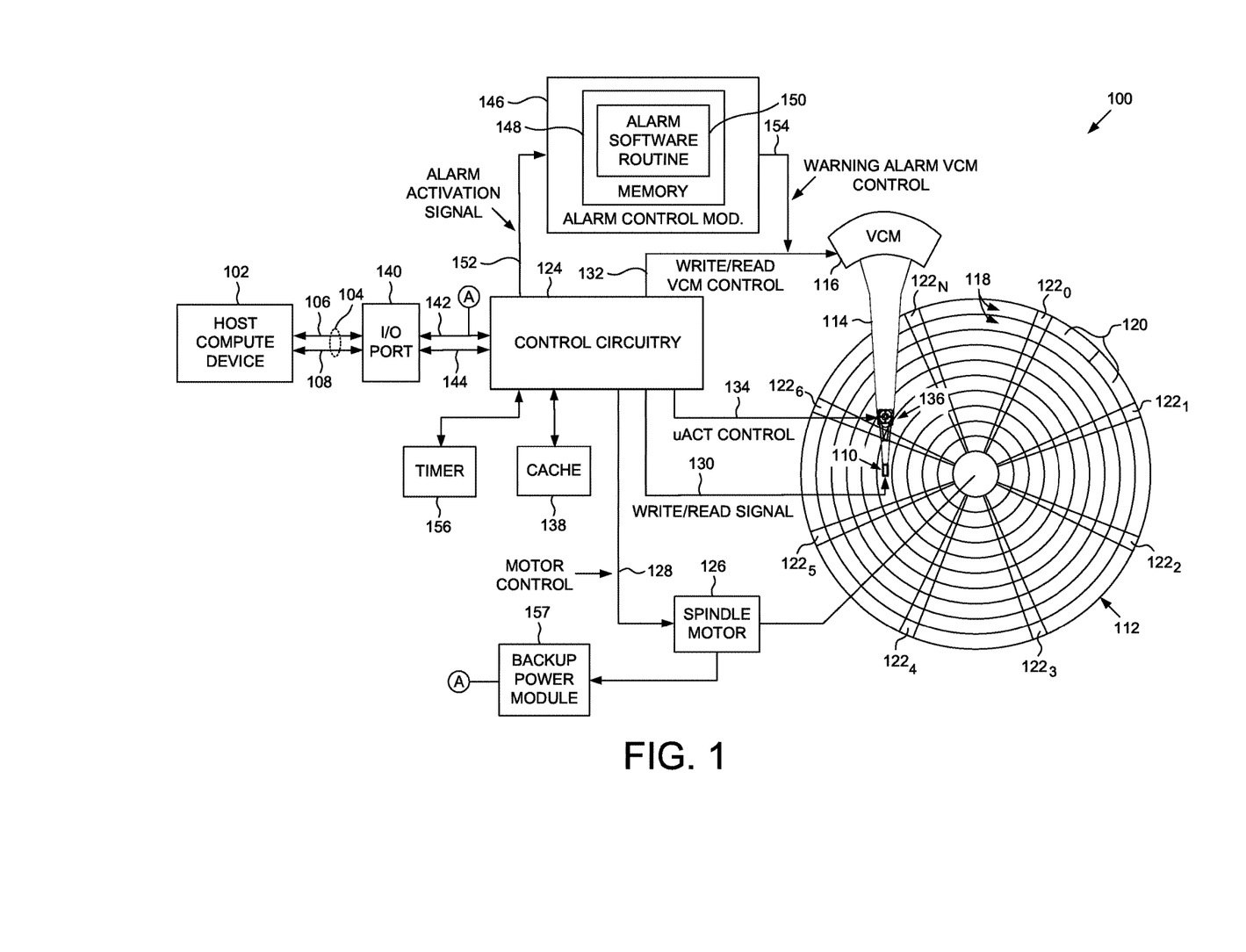
FIG. 1 is a block diagram showing a data storage device coupled to a host compute device and including control circuitry, a disk, and an actuator arm for radially actuating a head over the disk, wherein the control circuitry is configured to cause the actuator arm to provide a warning alarm when power from the host computed device is improperly removed from the data storage device, in accordance with one embodiment of the invention.

FIG. 1 shows a data storage device 100 (e.g., a hard disk drive (HDD) or a solid state hybrid drive (SSHD)) that is connected to a host compute device 102 (e.g., a PC or laptop computer) via a cable 104 and is bus-powered (i.e., it receives its power from the host compute device), in accordance with one embodiment of the invention. In the embodiment shown in FIG. 1, the cable 104 comprises a power bus 106 for providing power from the host compute device 102 to the data storage device 100 and at least one data bus 108 to enable data to be exchanged between the host compute device 102 and the data storage device 100. Depending on the connection technology used by the data storage device 100 and the host compute device 102, the cable 104 may be, for example, a USB, USB-C, or Thunderbolt™ cable.

In the embodiment shown in FIG. 1, the data storage device 100 comprises a head 110 actuated radially over a disk 112 by an actuator arm 114, and a voice coil motor (VCM) 116 configured to rotate the actuator arm 114 about a pivot. In the embodiment in FIG. 1, the disk 112 comprises a plurality of data tracks 118, wherein each data track 118 comprises a plurality of sectors 120, which can be addressed and used by the host compute device 102 for reading and writing data. The disk 112 further comprises a plurality of embedded servo sectors $122_0$-$122_N$ that define the data tracks 118. In the embodiment shown in FIG. 1, the data storage device 100 further comprises control circuitry 124 configured to actuate the head 110 over the disk 112 in response to the servo sectors $122_0$-$122_N$. The control circuitry 124 may comprise, for example, a microprocessor, combinatory logic, or a state machine. In one embodiment, the control circuitry 124 is situated in a System On a Chip (SOC) in the data storage device 100.

In the embodiment in FIG. 1, the disk 112 is rotated by a spindle motor 126 at a rotational speed that is controlled by the control circuitry 124, for example, a motor driver of the control circuitry 124, via a motor control signal 128. In the embodiment in FIG. 1, the control circuitry 124 processes a read signal 130 emanating from the head 110 to demodulate the servo sectors $122_0$-$122_N$ and generate a position error signal (PES) representing an error between the actual position of the head 110 and a target position relative to a target data track. The control circuitry 124 filters the PES using a suitable compensation filter to generate a write/read VCM control signal 132 applied to VCM 116, which rotates actuator arm 114 about the pivot in order to actuate the head 110 radially over the disk 112 in a direction that reduces the PES.

In the embodiment in FIG. 1, the control circuitry 124 also generates a control signal 134 applied to a microactuator 136 in order to actuate the head 110 over the disk 112 in fine movements. Any suitable microactuator 136 may be employed in various embodiments of the invention, such as a piezoelectric actuator. In addition, the microactuator 136 may actuate the head 110 over the disk 112 in any suitable manner, such as by actuating a suspension relative to the actuator arm, or actuating a slider relative to the suspension.

The servo sectors $122_0$-$122_N$ may comprise any suitable head position information, such as a track address for coarse positioning and servo bursts for fine positioning. The servo bursts may comprise any suitable pattern, such as an amplitude-based servo pattern or a phase-based servo pattern.

In the embodiment in FIG. 1, the data storage device 100 further comprises a cache 138, which serves as a temporary data storage location. The cache 138 can comprise, for example, dynamic random access memory (DRAM), static random access memory (SDRAM), or other non-persistent type of memory. In various embodiments of the invention, the cache 138 functions as a write buffer to temporarily store data from the host compute device 102 before it is written to the disk 112, which is a rotating magnetic non-volatile memory. In the embodiment in FIG. 1, the data storage device 100 further comprises an I/O port 140, which is configured to receive power to operate the data storage device 100 from the host compute device 102 via power bus 106 and to receive data from and provide data to the host compute device 102 via at least one data bus 108. The I/O port 140 is further configured to provide the power from the host compute device 102 to the control circuitry 124 via power bus 142, and provide the data from the host computed device 102 to the control circuitry 124 and provide the data from the control circuitry 124 to the host compute device 102 via at least one data bus 144. Depending on the protocol used for communication between the data storage device 100 and the host compute device 102, the I/O port 140 may be, for example, a USB, USB-C, or Thunderbolt™ I/O port.

In the embodiment shown in FIG. 1, the data storage device 100 further comprises alarm control module 146, which comprises memory 148 and an alarm software routine 150 (stored in the memory 148), and is coupled between the control circuitry 124 and the VCM 116. Memory 148, which stores the alarm software routine 150, can comprise, for example, Magnetoresistive random-access memory (MRAM), Chalcogenide RAM (C-RAM), correlated electron RAM (CeRAM), Phase Change Memory (PC-RAM or PRAM), Programmable Metallization Cell RAM (PMC-RAM or PMCm), Ovonic Unified Memory (OUM), Resistance RAM (ReRAM), NAND memory, NOR memory, EEPROM, Ferroelectric Memory (FeRAM), or other discrete non-volatile memory (NVM).

In the embodiment in FIG. 1, when the alarm software routine 150 is activated by the control circuitry 124 via an alarm activation signal 152, the alarm software routine 150 causes, via warning alarm VCM control 154, the VCM 116 to cause the actuator arm 114 to move such that its movement produces a unique sound. In the embodiment shown in FIG. 1, the unique sound that is produced by the movement of the actuator arm 114 that provides an audible warning alarm, which is used to indicate improper removal of the power from the host compute device 102. For example, the alarm software routine 150 can cause the VCM 116 to vibrate the actuator arm 114 at a predetermined frequency or pattern of frequencies to cause it to provide the audible warning alarm. The VCM 116 can be controlled by the control circuitry 124 to cause the actuator arm 114 to provide the warning alarm sound while the actuator arm 114 is in the process of parking the head 110 off the disk 112, for example. The VCM 116 can also be controlled by the control circuitry 124 to provide the warning alarm sound while the actuator arm 114 is parked on a ramp (not shown in FIG. 1) at the outside diameter of the disk 112. In one embodiment, the alarm software routine may be input into the memory 148 by a user via the I/O port 140. By inputting a difference alarm software routine into the memory 148 to control the actuator arm 114, the user can change the sound of the warning alarm.

In the embodiment shown in FIG. 1, the data storage device 100 further comprises a timer 156, which is coupled to the control circuitry 124. The timer 156, such as a watchdog timer, may be implemented in hardware or firmware, for example. In the embodiment in FIG. 1, the timer 156 is configured to open a timing window when a cache flush command is received from the host compute device 102 and close the timing window after a predetermined amount of time has expired or a host write command is received.

In the embodiment shown in FIG. 1, the data storage device 100 further comprises a backup power module 157 for providing backup power to the data storage device 100 when power from the host compute device 102 is removed. The backup power module 157 is coupled to the power bus 142 and the spindle motor 126 and may comprise a charge storage device (not shown in FIG. 1) comprising, for example, at least one capacitor or battery for storing motor energy that is generated by the spindle motor 126 when it spins down when power from the host compute device 102 is removed from the data storage device 100. The backup power module 157 may further comprise circuitry to detect when the power is removed from the data storage device 100 and provide backup power stored in the charge storage device to the power bus 142 to enable the control circuitry 124 to move the actuator arm 114 to park the head 110 off the disk 112 and provide the warning alarm if the power was improperly removed. In one embodiment, the backup power module 157 may also include a regulator to regulate the backup power.

The operation of the data storage device 100 in the embodiment shown in FIG. 1 when power from the host compute device 102 is removed will now be discussed. The control circuitry 124 detects when the power received from the host compute device 102 via the power bus 106 (in the cable 104) is removed from the data storage device 100. The control circuitry 124 may detect when power is removed from the data storage device 100 by, for example, monitoring the power bus 142. For example, the power may be removed from the data storage device 100 by disconnecting the cable 104 (and, consequently, the power bus 106) from the I/O port 140 or disconnecting the cable 102 from the host compute device 102. Once the control circuitry 124 detects that the power has been removed from the data storage device 100, the control circuitry 124 determines whether a timing window that is opened by the timer 156 when a cache flush command is received from the host compute device 102 is open or closed.

When a procedure to remove the data storage device from the host compute device is initiated by a user, the host compute device 102 sends a cache flush command to the data storage device 100 and, depending on the operating system, may provide a message on its screen indicating that the data storage device 100 may now be safely removed (i.e., disconnected) from the host compute device 102. The removal procedure may differ slightly depending on the operating system. For example, in a Windows® 7 operating system, the user right clicks on an on-screen icon representing the data storage device on the screen of the host compute device and selects "Eject" from a pull down menu. After selecting "Eject," the host compute device sends the cache flush command to the data storage device and the message "Safe to Remove Hardware" appears at the bottom of the screen. The user can now safely disconnect the data storage device from the host compute device. When the cache flush command is received from the host compute device 102 and executed by the control circuitry 124, user data that is temporarily stored in the cache 138 is flushed (i.e., written) to NVM (e.g., disk 112), where the user data is safe from the power loss that occurs when the power from the host compute device 102 is removed.

In the embodiment shown in FIG. 1, when the cache flush command is received from the host compute device 102, the timing window that is opened by the timer 156 remains open for a predetermined amount of time, and when the predetermined amount of time has expired, the timer 156 closes the timing window. In the embodiment in FIG. 1, the timer 156 will close the timing window prior to expiration of the predetermined amount of time if a write command is received from the host compute device 102. If the control circuitry 124 determines that the timing window is closed, the control circuitry 124 provides a warning alarm to indicate improper removal of the power from the host compute device 100. For example, the user may have removed power from the data storage device 100 by disconnecting the cable 104 without right clicking on the on-screen icon representing the data storage device 100 and selecting "Eject" from a pull-down menu on the screen of the host compute device 102.

In the embodiment shown in FIG. 1, the control circuitry 124 provides the warning alarm by sending the alarm activation signal 152 to the alarm control module 146 to activate the alarm software routine 150. Once activated, the alarm software routine 150 causes the VCM 116 (via the warning alarm VCM control 154) to cause the actuator arm 114 to move such that its movement produces a unique sound that provides the warning alarm. If the control circuitry 124 determines that the timing window is open, no warning alarm is provided. When the timing window is open, it is safe to remove the power provided to the data storage device 100 from the host compute device, and, therefore, no warning alarm needs to be provided.

Figure 2:
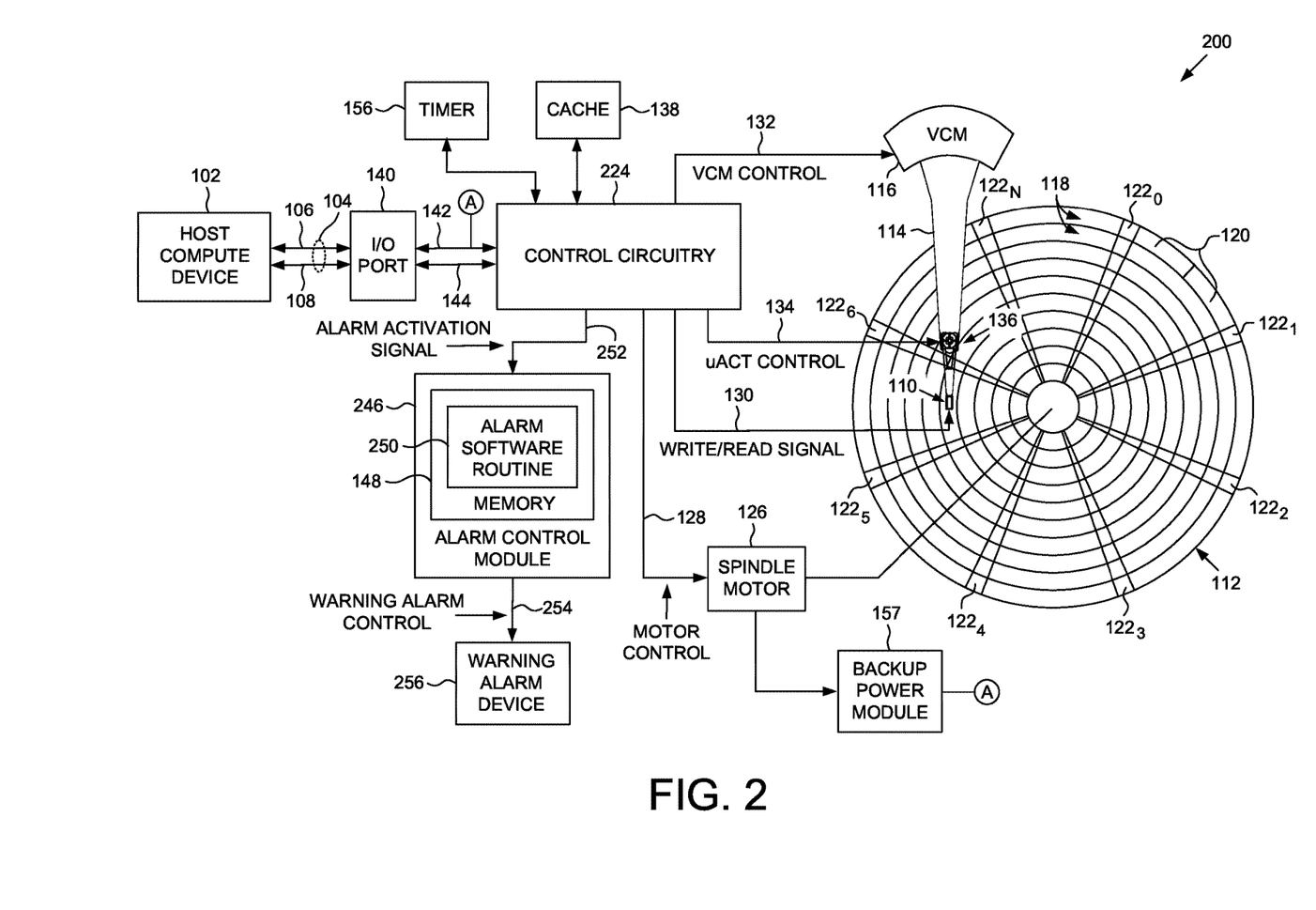
FIG. 2 is a block diagram showing a data storage device coupled to a host compute device and including control circuitry, a disk for storing data, and a warning alarm device, wherein the control circuitry is configured to cause the warning alarm device to provide a warning alarm when power from the host computed device is improperly removed from the data storage device, in accordance with one embodiment of the invention.

FIG. 2 shows a data storage device 200 (e.g., an HDD or SSHD) that is connected to a host compute device 102 (e.g., a PC or laptop computer) via a cable 104 and is bus-powered, in accordance with one embodiment of the invention. To avoid duplicate description and preserve brevity, only the differences between data storage device 200 in FIG. 2 and data storage device 100 in FIG. 1 will be described herein. In the embodiment shown in FIG. 2, control circuitry 224 is coupled to an alarm control module 246, which comprises memory 148 and an alarm software routine 250, which is stored in the memory 148, and the alarm control module 246 is coupled to a warning alarm device 256.

In the embodiment shown in FIG. 2, the warning alarm device 256 may comprise, for example, a light-emitting device (e.g., at least one white and/or colored or bi-colored LED or LCD) or a sound-emitting device (e.g., an annunciator or other device capable of producing a sound). For example, an annunciator may comprise a speaker (e.g., a piezoelectric speaker). In one embodiment, the warning alarm device 256 may comprise a sound-emitting device and a light-emitting device. In one embodiment, the warning alarm device 256 may comprise at least one LED that is also used to perform another function in the data storage device 200, such as indicating the presence of power or data activity, for example.

In the embodiment shown in FIG. 2, the alarm software routine 250 comprises code that is programmed to cause the warning alarm device 256 to provide a warning alarm via warning alarm control signal 254 when activated by the control circuitry 224 via alarm activation signal 252. For example, if the warning alarm device 256 comprises a light-emitting device, the alarm software routine 250 can be programmed to cause the light-emitting device to provide a visual warning alarm, or if the warning alarm device 256 comprises a sound-emitting device, the alarm software routine 250 can be programmed to cause the sound-emitting device to provide an audible warning alarm. In an embodiment in which the warning alarm device 256 comprises light-emitting and sound-emitting devices, the alarm software routine 250 may be programmed to provide a warning alarm that is visual and audible.

In an embodiment in which the warning alarm device 256 comprises at least one LED, the alarm software routine 250 may comprise code that causes the at least one LED to provide a warning alarm by, for example, rapidly turning on and off (blinking) or changing color. Alternatively, in an embodiment in which the warning alarm device 256 comprises a sound-emitting device (e.g., an annunciator), the alarm software routine 250 may comprise code that causes the sound-emitting device to provide a warming alarm that comprises a distinct sound or pattern of sounds. In one embodiment, the alarm software routine 250 may be input into the memory 148 by a user via I/O port 140. For example, in an embodiment in which the warning alarm device 256 comprises a sound-emitting device, the user may input an alarm software routine that causes the sound-emitting device to provide a warning alarm comprising a user-selected pattern of sounds, or in an embodiment in which the warning alarm device 256 comprises at least one LED, the user may input an alarm software routine that causes the at least one LED to provide a warning alarm comprising a user-selected pattern of on/off transitions.

The operation of the data storage device 200 in the embodiment shown in FIG. 2 when power from the host compute device 102 is removed will now be discussed. The control circuitry 224 detects when the power received from the host compute device 102 via the power bus 106 (in the cable 104) is removed from the data storage device 200. Once the control circuitry 224 detects that the power has been removed from the data storage device 200, the control circuitry 224 determines whether a timing window that is opened by the timer 156 when a cache flush command is received from the host compute device 102 is open or closed.

As discussed above, when the cache flush command is received from the host compute device 102 and the timing window is opened by the timer 156, the timing window remains open for a predetermined amount of time. When the predetermined amount of time has expired, the timer 156 closes the timing window. The timing window also closes if a write command is received from the host compute device 102. If the control circuitry 224 determines that the timing window is closed, the control circuitry 224 provides a warning alarm to indicate improper removal of the power from the host compute device 200.

In the embodiment shown in FIG. 2, the control circuitry 224 provides the warning alarm by sending the alarm activation signal 252 to the alarm control module 246 to activate the alarm software routine 250. Once activated, the alarm software routine 250 causes, via the warning alarm control 254, the warning alarm device 256 to provide the warning alarm. For example, the warning alarm will be an audible warning alarm or a visual warning alarm depending on whether the warning alarm device 256 comprises a respective sound-emitting warning device or light-emitting warning device. In an embodiment in which the warning alarm device 256 comprises a light-emitting warning device and a sound-emitting warning device, the warming alarm will be audible and visual. If the control circuitry 224 determines that the timing window is open, no warming alarm is provided.

Figure 3:
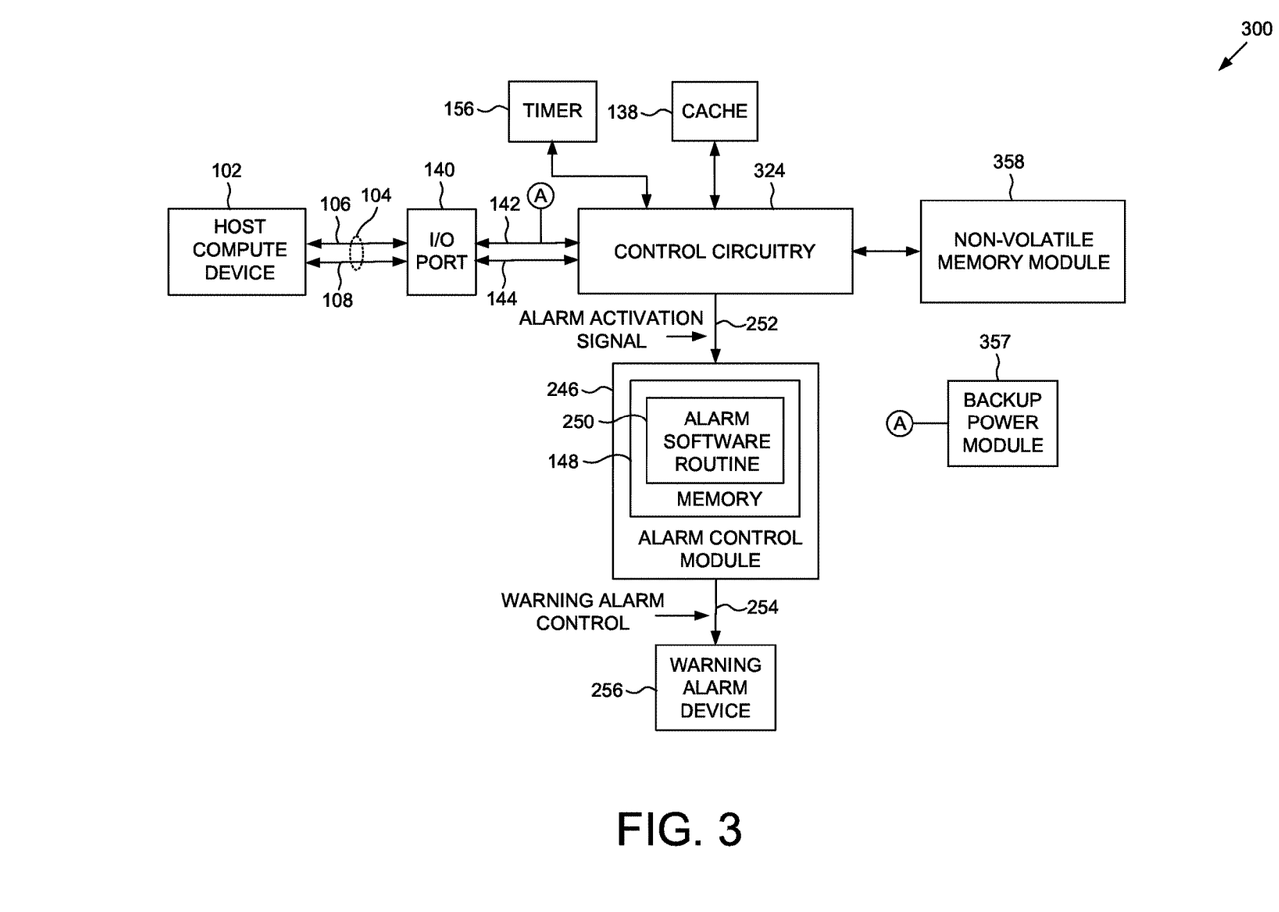
FIG. 3 is a block diagram showing a data storage device coupled to a host compute device and including control circuitry, a solid-state memory array for storing data, and a warning alarm device, wherein the control circuitry is configured to cause the warning alarm device to provide a warning alarm when power from the host computed device is improperly removed from the data storage device, in accordance with one embodiment of the invention.

FIG. 3 shows a data storage device 300 (e.g., a solid state storage device (e.g., SSD, flash stick, or SD card) that is connected to a host compute device 102 (e.g., a PC or laptop computer) and is bus-powered, in accordance with one embodiment of the invention. To avoid duplicate description and preserve brevity, only the differences between data storage device 300 in FIG. 3 and data storage devices 100 in FIGS. 1 and 200 in FIG. 2 will be described herein. In an embodiment in which the data storage device 300 comprises an SSD, a cable 104, which comprises a power bus 106 and at least one data bus 108, may be used to provide a connection between the host compute device 102 and the data storage device 300 to enable the data storage device 300 to receive power from the host compute device 102 and enable data to be exchanged between the devices.

However, in an embodiment in which the data storage device 300 comprises a solid state storage device such as a flash stick or SD card, the data storage device 300 may plug directly into the host compute device 102 without requiring a cable 104 to receive power from and exchange data width the host compute device 102. For example, in an embodiment in which the data storage device 300 comprises a flash stick, the I/O port 140 may comprise a USB male connector, which can plug into a corresponding USB receptacle on the host compute device 102 to provide a connection between the power bus 142 and the at least one data bus 144 in the data storage device 300 and a respective corresponding power and data buses in the host compute device 102. Similarly, in an embodiment in which the data storage device 300 comprises an SD card, the I/O port 140 may comprise an SD card connector, which can plug into a corresponding SD card slot on the host compute device 102 to provide a connection between the power bus 142 and the least one data bus 144 in the data storage device 300 and respective corresponding power and data buses in the host compute device 102.

In the embodiment shown in FIG. 3, control circuitry 324 is coupled to non-volatile memory (NVM) module 358, which provides a persistent storage location in the data storage device 300 for user as well as system data. NVM module 358 may comprise, for example, NAND or NOR flash memory, MRAM, C-RAM, CeRAM, PC-RAM (or PRAM), PMC-RAM (or PMCm), OUM, ReRAM, EEPROM, FeRAM, or other NVM other than rotating magnetic media. In one embodiment, the NVM module 358 may comprise a non-volatile semiconductor memory array, which may comprise, for example, NAND or NOR flash memory.

In the embodiment shown in FIG. 3, the data storage device 300 further comprises a backup power module 357 for providing backup power to the data storage device 300 when power from the host compute device 102 is removed. The backup power module 157 is coupled to the power bus 142 and may comprise a charge storage device (not shown in FIG. 3), for example, at least one capacitor or battery. In the embodiment shown in FIG. 3, the charge storage device may store energy received from the host compute device 102 via the power bus 142 while the data storage device 300 is connected to host compute device 102. The backup power module 357 may further comprise circuitry to detect when the power is removed from the data storage device 300 and provide backup power stored in the charge storage device to the power bus 142 to enable the control circuitry 324 to provide a warning alarm if the power from the host compute device 102 was improperly removed.

The operation of the data storage device 300 in the embodiment shown in FIG. 3 when power from the host compute device 102 is remove is substantially the same as discussed above with respect to data storage device 200 in the embodiment shown in FIG. 2, and so will not be repeated here.

Figure 4:
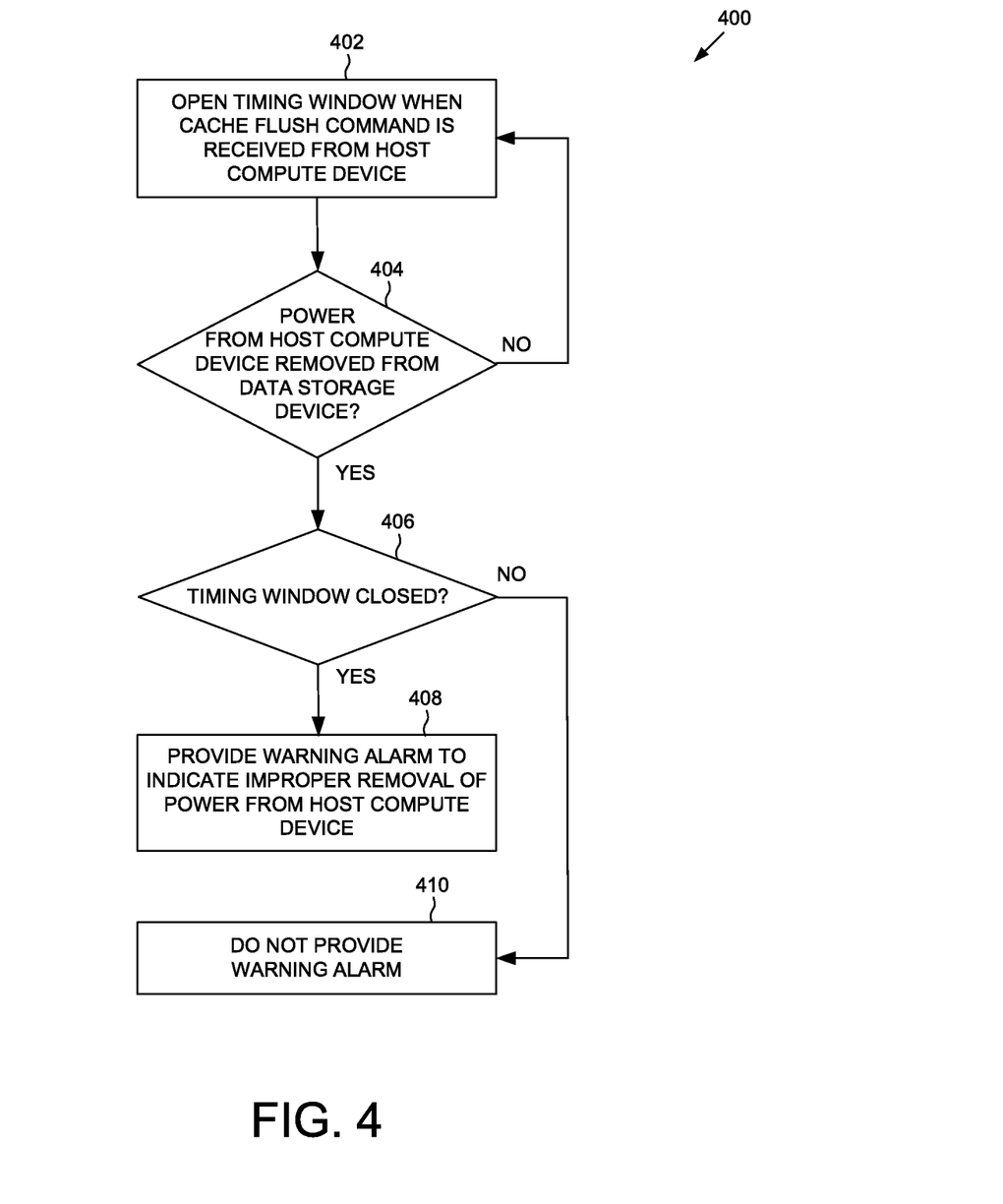
FIG. 4 is a flow diagram showing a process that detects when power from a host compute device is removed from a data storage device, determines if a timing window is closed, and, if the timing window is closed, provides a warning alarm to indicate improper removal of the power from the host compute device, in accordance with one embodiment of the invention.

FIG. 4 shows a process 400 for determining whether power has been improperly removed from a data storage device 100-300 (FIG. 1-3) (e.g., an HDD, SSHD, or solid state storage device (e.g., SSD, flash stick, or SD card) that receives its power from a host compute device 102 (FIG. 1-3), and if so, providing a warning alarm, in accordance with one embodiment of the invention. The process 400 may be implemented by control circuitry 124 (FIG. 1), 224 (FIG. 2), 324 (FIG. 3) in the data storage device 100-300 (FIG. 1-3).

The process 400 starts in block 402, where a timing window is opened when a cache flush command is received from a host compute device 102 (FIG. 1-3). For example, the timing window may be opened by a timer 156 (FIG. 1-3), which may be implemented in hardware or firmware. As previously discussed, when a user initiates a removal procedure for a data storage device (e.g., an HDD, SSHD, or solid state storage device (e.g., SSD, flash stick, or SD card)) that is connected to and receives power from a host compute device (e.g., PC or laptop computer), the host compute device will send out a flush command that, when received and executed by control circuitry in the data storage device, causes user data that is temporarily store in a cache 138 (FIG. 1-3) to be written to NVM (e.g., disk 112 in FIG. 1-2 or NVM module 358 (FIG. 3)), where the user data will be safe from a power loss that will occur when power is removed from the data storage device.

In block 404, the process 400 determines if power from the host compute device is removed from the data storage device. For example, the control circuitry in the data storage device may determine if the power from the host compute device is removed by monitoring a power bus 142 (FIG. 1-3) in the data storage device. When the process 400 determines that the power from the host compute device has not been removed, the process 400 returns to block 402. When the process 400 determines in block 404 that the power has been removed, the process determines in block 406 if a timing window is closed. As described above, a timer 156 (FIG. 1-3) may be configured to open the timing window when the cache flush command is received from the host compute device and close the timing window after a predetermined amount of time has expired or a host write command is received. When the timing window is not closed (i.e., open), the process in block 410 does not provide a warning alarm.

When the process determines in block 406 that the timing window is closed, the process provides in block 408 a warning alarm to indicate improper removal of power from the host compute device. For example, the warning alarm may be audile, visual, or both audible and visible. In the embodiment in FIG. 1, for example, the control circuitry activates an alarm software routine 150 to cause an actuator arm 114 in the data storage device 100 to move (e.g., vibrate) such that its movement produces a unique sound that provides the warning alarm. For example, an audible or visual warning alarm may be provided by a warning alarm device 256 (in the embodiments in FIGS. 2 and 3) when the warning alarm device comprises a sound-emitting device (e.g., an annunciator) or a light-emitting device (e.g., at least one LED), respectively. For example, the warning alarm by be provided by activating an alarm software routine 150 (FIG. 1), 250 (FIG. 2-3) in a memory 148 (FIG. 1-3) in an alarm control module 146 (FIG. 1), 246 (FIG. 2-3) in the data storage device. In one embodiment, the alarm software routine may be input into the memory by a user via an I/O port 140 (FIG. 1-3) in the data storage device.

It is noted that the blocks (i.e., steps) in the flow diagram in FIG. 4 are shown in a particular order to illustrate an embodiment of the invention. In other embodiments, the blocks in the flow diagram in FIG. 4 may be performed in a different order.

Any suitable control circuitry 124 (FIG. 1), 224 (FIG. 2), 324 (FIG. 3) may be employed in the embodiments of the invention, such as any suitable integrated circuit or circuits. For example, the control circuitry may be integrated into an SOC in an embodiment of the invention. In one embodiment, the control circuitry comprises a microprocessor executing instructions, the instructions being operable to cause the microprocessor to perform the blocks in the flow diagram described herein. The instructions may be stored in any computer-readable medium. In one embodiment, they may be stored on a non-volatile semiconductor memory external to the microprocessor, or integrated with the microprocessor in an SOC. In another embodiment, the control circuitry comprises suitable logic circuitry, such as state machine circuitry.

What is claimed is:

1. A data storage device configured to connect to a host compute device via a power bus and at least one data bus, the data storage device comprising:
   an input/output (I/O) port configured to: receive power from the power bus to operate the data storage device; and provide data to and receive data from the host compute device via the at least one data bus;
   a timer configured to: open a timing window in response to receiving a cache flush command from the host compute device; and close the timing window after a predetermined amount of time has expired or a host write command is received; and
   control circuitry configured to:
      detect that the power from the host compute device is removed from the data storage device;
      determine whether the timing window is closed; and
      provide a warning alarm to indicate improper removal of the power from the host compute device in response to determining that the timing window is closed.

2. The data storage device as recited in claim 1, wherein the warning alarm is audible.

3. The data storage device as recited in claim 1, wherein the warning alarm is visual.

4. The data storage device as recited in claim 1, wherein the warning alarm is audible and visual.

5. The data storage device as recited in claim 1, further comprising: a disk for storing data; a head for reading data from and writing data to the disk; and an actuator arm for radially actuating the head over the disk, wherein the control circuitry is further configured to cause the actuator arm to provide the warning alarm.

6. The data storage device as recited in claim 5, wherein the control circuitry is further configured to cause the actuator arm to provide the warning alarm while the actuator arm is in the process of parking the head off the disk.

7. The data storage device as recited in claim 5, wherein the control circuitry is further configured to activate an alarm software routine to cause the actuator arm to provide the warning alarm.

8. The data storage device as recited in claim 1, further comprising a warning alarm device, wherein the control circuitry is further configured to cause the warning alarm device to provide the warning alarm.

9. The data storage device as recited in claim 8, wherein the warning alarm device comprises an annunciator.

10. The data storage device as recited in claim 8, wherein the warning alarm device comprises at least one light-emitting device (LED).

11. The data storage device as recited in claim 10, wherein the at least one LED is also used to perform another function in the data storage device.

12. The data storage device as recited in claim 8, further comprising an alarm control module coupled to the warning alarm device wherein: the control circuitry is further configured to activate an alarm software routine to cause the warning alarm device to provide the warning alarm; and the alarm control module comprises the alarm software routine.

13. The data storage device as recited in claim 12, wherein the alarm software routine is input by a user via the I/O port.

14. The data storage device as recited in claim 1, wherein the I/O port is a USB port.

15. The data storage device as recited in claim 1, wherein the I/O port is a Thunderbolt port.

16. The data storage device as recited in claim 1, wherein the I/O port is an SD card port.

17. The data storage device as recited in claim 1, wherein the data storage device is a solid state storage device.

18. The data storage device as recited in claim 1, wherein the data storage device is a hard disk drive.

19. A method of operating a data storage device configured to connect to a host compute device via a power bus and at least one data bus, the data storage device comprising an input/output (I/O) port configured to receive power from the power bus to operate the data storage device, and provide data to and receive data from the host compute device via the at least one data bus, and a timer configured to open a timing window in response to receiving a cache flush command from the host compute device and close the timing window after a predetermined amount of time has expired or a host write command is received, the method comprising:

detecting that the power from the host compute device is removed from the data storage device;

determining whether the timing window is closed; and providing a warning alarm to indicate improper removal of the power from the host compute device, in response to determining that the timing window is closed.

20. The method as recited in claim 19, wherein the warning alarm is audible.

21. The method as recited in claim 19, wherein the warning alarm is visual.

22. The method as recited in claim 19, wherein the warning alarm is audible and visual.

23. The method as recited in claim 19, wherein the data storage device further comprises: a disk for storing data; a head for reading data from and writing data to the disk; and an actuator arm for radially actuating the head over the disk, further comprising causing the actuator arm to provide the warning alarm.

24. The method as recited in claim 23, further comprising causing the actuator arm to provide the warning alarm while the actuator arm is in the process of parking the head off the disk.

25. The method as recited in claim 23, further comprising activating an alarm software routine to cause the actuator arm to providing the warning alarm.

26. The method as recited in claim 19, further comprising causing a warning alarm device to provide the warning alarm, wherein the data storage device further comprises the warning alarm device.

27. The method as recited in claim 26, wherein the warning alarm device comprises an annunciator.

28. The method as recited in claim 26, wherein the warning alarm device comprises at least one light-emitting device (LED).

29. The method as recited in claim 26, further comprising activating an alarm software routine to cause the warning alarm device to provide the warning alarm, wherein: the data storage device further comprises an alarm control module; and the alarm control module comprises the alarm software routing.

30. The method as recited in claim 29, wherein the alarm software routine is input by a user via the I/O port.

* * * * *